United States Patent [19]

Horiike et al.

[11] Patent Number: 5,042,608

[45] Date of Patent: * Aug. 27, 1991

[54] FRONT-WHEEL-DRIVE MOTORCYCLE

[75] Inventors: Satoru Horiike, Tokyo; Yasuhiko Nakano, Sayama, both of Japan

[73] Assignee: Honda Giken Kogyo Kabushiki Kaisha, Tokyo, Japan

[*] Notice: The portion of the term of this patent subsequent to Apr. 17, 2007 has been disclaimed.

[21] Appl. No.: 402,412

[22] Filed: Sep. 5, 1989

[30] Foreign Application Priority Data

Sep. 5, 1988 [JP] Japan .................................. 63-220537

[51] Int. Cl.⁵ .............................................. B62K 11/02
[52] U.S. Cl. ..................................... 180/219; 180/223
[58] Field of Search .............. 180/210, 213, 215, 219, 180/223, 224, 227, 231

[56] References Cited

U.S. PATENT DOCUMENTS

| 3,340,947 | 9/1967 | Hollinshead | 180/223 |
|---|---|---|---|
| 3,800,898 | 4/1974 | Griffin | 180/224 |
| 4,662,469 | 5/1987 | Matsuda | 180/219 |
| 4,666,018 | 5/1987 | Shibuya | 180/213 |
| 4,712,638 | 12/1987 | Kawaguchi | 180/219 |
| 4,917,209 | 4/1990 | Horiike et al. | 180/223 X |

FOREIGN PATENT DOCUMENTS

| 2930122 | 2/1981 | Fed. Rep. of Germany |  |
|---|---|---|---|
| 919322 | 3/1947 | France |  |
| 0282333 | 8/1987 | Japan | 180/219 |
| 1180212 | 2/1970 | United Kingdom |  |

*Primary Examiner*—Charles A. Marmor
*Assistant Examiner*—Victor E. Johnson
*Attorney, Agent, or Firm*—Armstrong, Nikaido, Marmelstein, Kubovcik & Murray

[57] ABSTRACT

A front-wheel-drive motorcycle includes a main frame supporting a rear wheel with a rounded tread tire mounted thereon and also supporting a saddle seat, and a front frame supporting a front drive wheel with a flat tread tire mounted thereon. The main frame is coupled to the front frame by a joint shaft extending in a longitudinal direction and is angularly movable about the joint shaft.

8 Claims, 4 Drawing Sheets

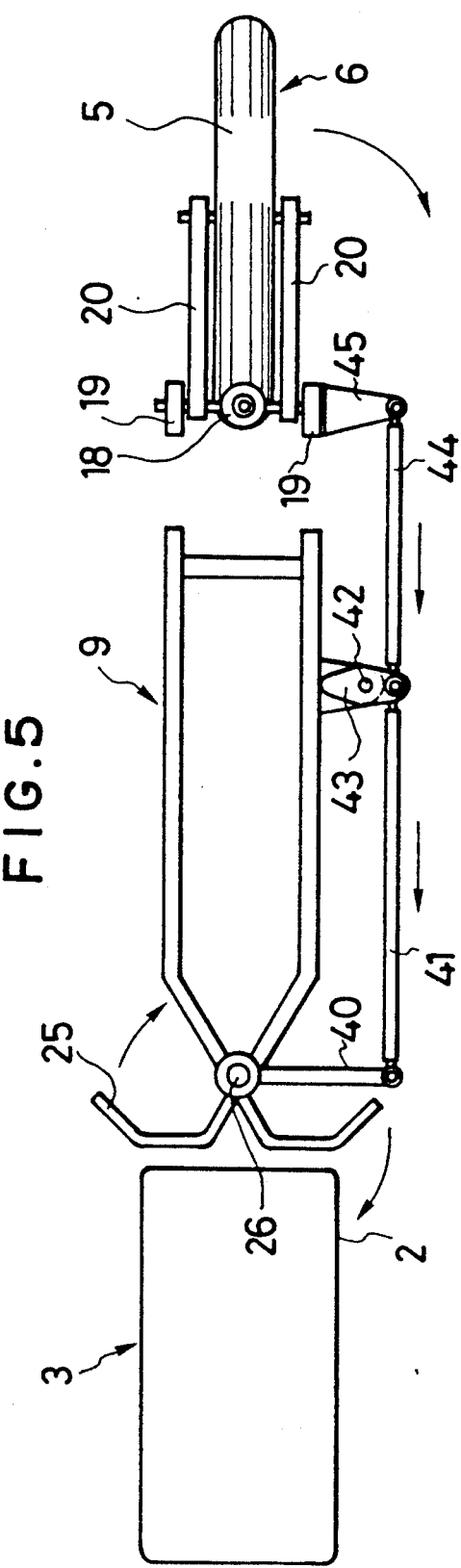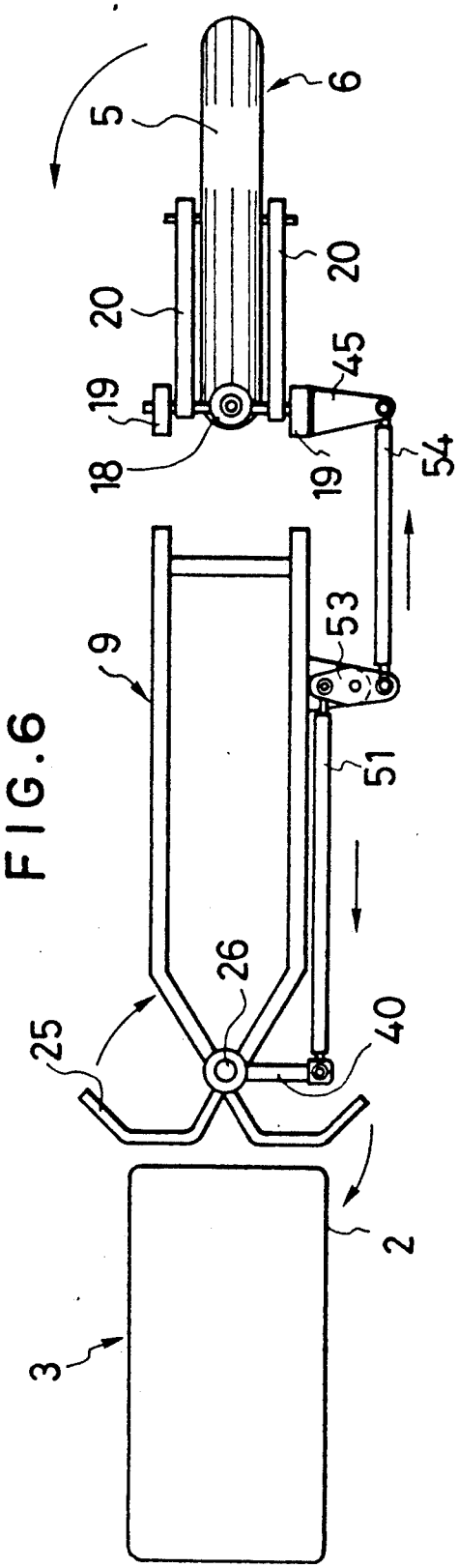

FRONT-WHEEL-DRIVE MOTORCYCLE

BACKGROUND OF THE INVENTION

The present invention relates to a front-wheel-drive motorcycle.

One known mechanism for transmitting drive power from a power unit such as an engine mounted in a motorcycle frame to a front wheel of a front-wheel-drive motorcycle is disclosed in Japanese Patent Publication No. 44-4694, for example. In order to drive the front wheel while the motorcycle is making a turn, the motorcycle includes a mechanism such as a universal joint for transmitting the drive power to the front wheel. Therefore, the mechanism for transmitting the drive power to the front wheel is relatively complex in structure.

When an ordinary motorcycle makes a turn, the frame of the motorcycle is required to bank together with the front and rear wheels toward the center of the turning circle in order to counteract the centrifugal forces exerted on the motorcycle frame. Therefore, the speed of travel of the motorcycle has to be lowered in general when the motorcycle turns.

SUMMARY OF THE INVENTION

In view of the aforesaid drawbacks of the conventional front-wheel-drive motorcycle, it is an object of the present invention to provide a front-wheel-drive motorcycle having a simple front wheel drive mechanism.

Another object of the present invention is to provide a front-wheel-drive motorcycle which can make a turn at a high speed.

To achieve the above objects, there is provided a front-wheel-drive motorcycle comprising a main frame supporting a rear wheel with a rounded tread tire mounted thereon and also supporting a saddle seat, a front frame supporting a front drive wheel with a flat tread tire mounted thereon, and a joint shaft extending in a longitudinal direction of the motorcycle, the main frame being coupled to the front frame by the joint shaft for angular movement about the joint shaft.

The front-wheel-drive motorcycle further includes a power unit for driving the front wheel, the power unit being mounted on the front frame.

The front-wheel-drive motorcycle further includes a swing arm by which the front wheel is supported on the front frame.

The main frame has a front portion overhanging the front frame.

When the motorcycle makes a turn, the rider seated on the saddle seat shifts his weight in the direction in which the motorcycle is turned, thus causing the main frame and the rear wheel to bank about the joint shaft to counter act centrifugal forces exerted on the motorcycle during the turn.

Since the wide flat tread tire is mounted on the front wheel, it prevents the front wheel and the front frame from banking, and the motorcycle is allowed to turn while large drive power is being transmitted to the front wheel.

The joint shaft extends such that the axis thereof passes below a point where the rear wheel contacts a road surface.

Inasmuch as the axis of the joint shaft extends below the point where the rear wheel contacts the road surface, when the rear wheel banks, the rear portion of the joint shaft is tilted outwardly of the point of contact of the rear wheel with the road surface, as viewed in plan. In response to the tilting movement of the joint shaft, the front frame is turned in the direction in which the motorcycle turns. The motorcycle is thus turned automatically while the front wheel remains upstanding.

Even without the front wheel being positively steered, the front wheel is steered of its own accord by causing the main frame and the rear wheel to bank in the direction in which the motorcycle is to turn. The motorcycle can thus be steered.

The front-wheel-drive motorcycle further includes a steering handle for steering the rear wheel.

The steering handle is mounted on a front portion of the main frame, the rear wheel being supported on a rear portion of the main frame.

The front-wheel-drive motorcycle further includes means on the main frame for transmitting steering action of the steering handle to the rear wheel.

This means allows the steering handle to steer the rear wheel for increased turning performance of the motorcycle.

The above and other objects, features and advantages of the present invention will become more apparent from the following description when taken in conjunction with the accompanying drawings in which preferred embodiments of the present invention are shown by wa of illustrative example.

BRIEF DESCRIPTION OF THE DRAWINGS

FIG. 5 is a plan view of the motorcycle of FIG. 4, showing a mechanism for steering a rear wheel; and FIG. 6 is a plan view similar to FIG. 5, showing a modified mechanism for steering a rear wheel.

DETAILED DESCRIPTION OF THE PREFERRED EMBODIMENTS

Figure 1:
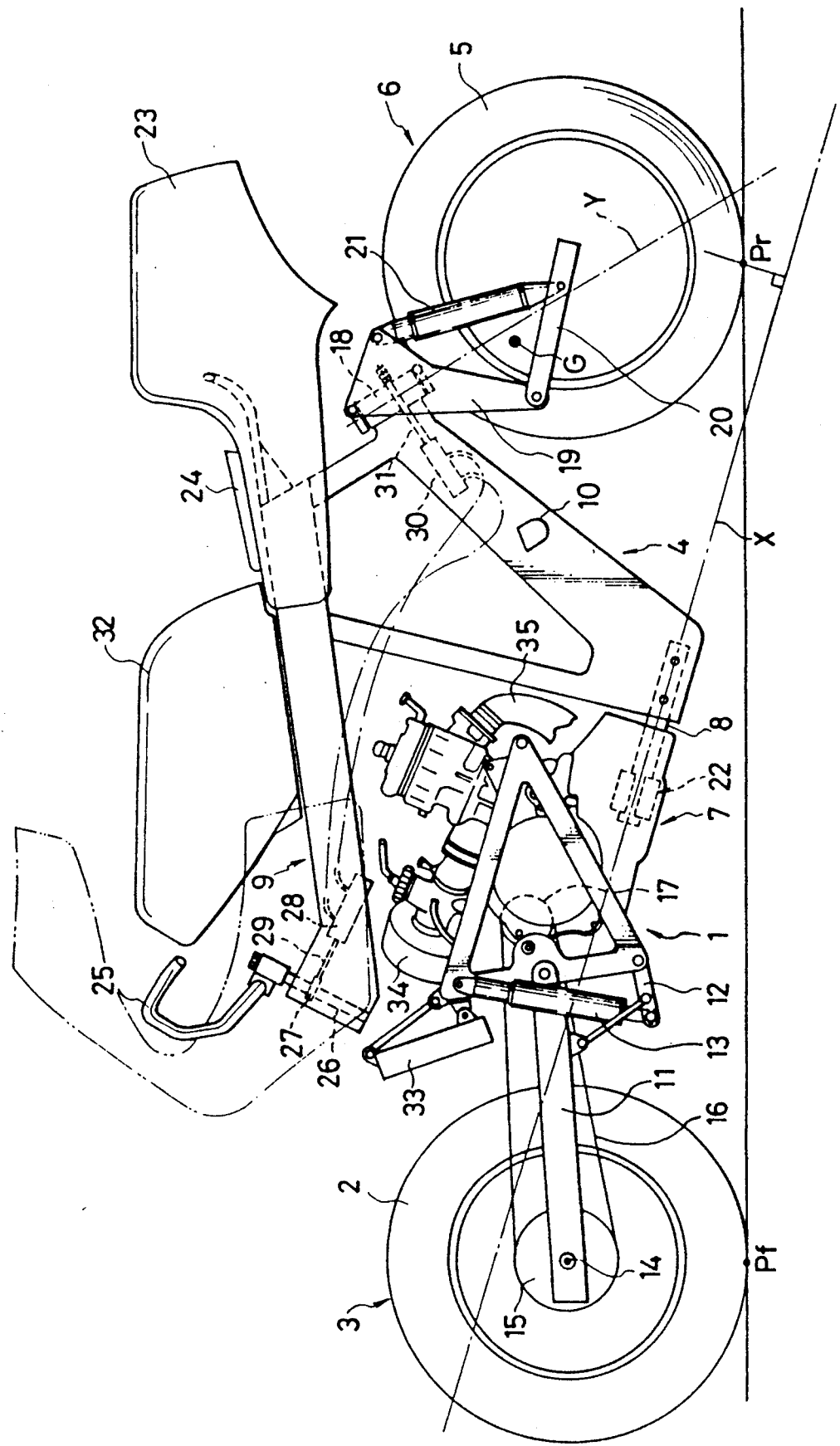
FIG. 1 is a side elevational view of a front-wheel-drive motorcycle according to an embodiment of the present invention.

As shown in FIG. 1, a front-wheel-drive motorcycle according to an embodiment of the present invention comprises a front frame 1 supporting on its front portion a front wheel 3 with a wide flat tread tire mounted thereon, a main frame 4 supporting on its rear portion a rear wheel 6 with a rounded tread tire 5 mounted thereon, a power unit 7 such as an internal combustion engine installed on a lower portion of the front frame 1, a joint shaft 8 by which the power unit 7 and the main frame 4 are interconnected in the longitudinal direction of the motorcycle, and a seat frame 9 which is part of the main frame 4. A pair of foot steps 10 (one shown) is attached to a lower portion of the main frame 4.

The front wheel 3 is rotatably supported on the front frame 1 by means of a swing arm 11 extending forwardly from the front portion of the front frame 1. The swing arm 11 has a lower portion supported by a link 12 coupled at its rear end to the front frame 1. The link 12 has a front end also coupled to the front frame 1 by means of a substantially vertical damper 13.

The front wheel 3 has a gear 15 rotatable about an axle 14 of the front wheel 3. The gear 15 is operatively coupled to a drive gear 17 of the power unit 7 through an endless chain 16, so that drive power from the power unit 7 can be transmitted to the front wheel 3.

A rear fork 19 which is angularly movable about a substantially vertical steering shaft 18 mounted on the main frame 4 extends downwardly and is mounted on the rear portion of the main frame 4. The rear wheel 6 is supported on the rear fork 19 by a swing arm 20 and a substantially vertical damper 21.

The joint shaft 8 has a rear end fixed to the main frame 4 and a front end angularly movably supported in the power unit 7 by means of a Neidhart mechanism 22. Therefore, the main frame 4 can bank about the joint shaft 8 laterally of the frame assembly of the motorcycle. The axis X of the joint shaft 8 is inclined rearwardly downwardly and passes below a point Pr where the rear wheel 6 contacts the road surface.

The seat frame 9 has a rear portion fixed to the main frame 4 and a front portion overhanging the power unit 7. A cowl 23 which extends over the rear wheel 6 is attached to the rear portion of the seat frame 9, with a saddle seat 24 mounted on a front upper surface of the cowl 23.

A steering handle 25 for steering the rear wheel 6 is connected to a substantially vertical handle shaft 26 rotatably supported in the front end of the seat frame 9. The handle shaft 26 supports a pinion gear 27 thereon which is held in mesh with a rack (not shown) on a piston rod 29 of a hydraulic cylinder 28 fixedly mounted in the seat frame 9. The hydraulic cylinder 28 is hydraulically connected to a hydraulic cylinder 30 fixedly mounted in a rear portion of the main frame 4. The hydraulic cylinder 30 has a piston rod 31 which has a rack (not shown) held in mesh with a pinion gear (not shown) supported on the steering shaft 18.

Therefore, when the steering handle 25 is turned or angularly moved about the axis of the handle shaft 26, the hydraulic cylinders 28, 30 are operated to turn the rear fork 19 about the axis of the steering shaft 18, thus steering the rear wheel 6.

A fuel tank 32 is mounted on the upper surface of the seat frame 9 in front of the saddle seat 24. A radiator 33 for use with the power unit 7 is mounted on a front upper portion of the frame frame 1. The power unit 7 has an air cleaner 34 and an exhaust pipe 35.

Figure 2:
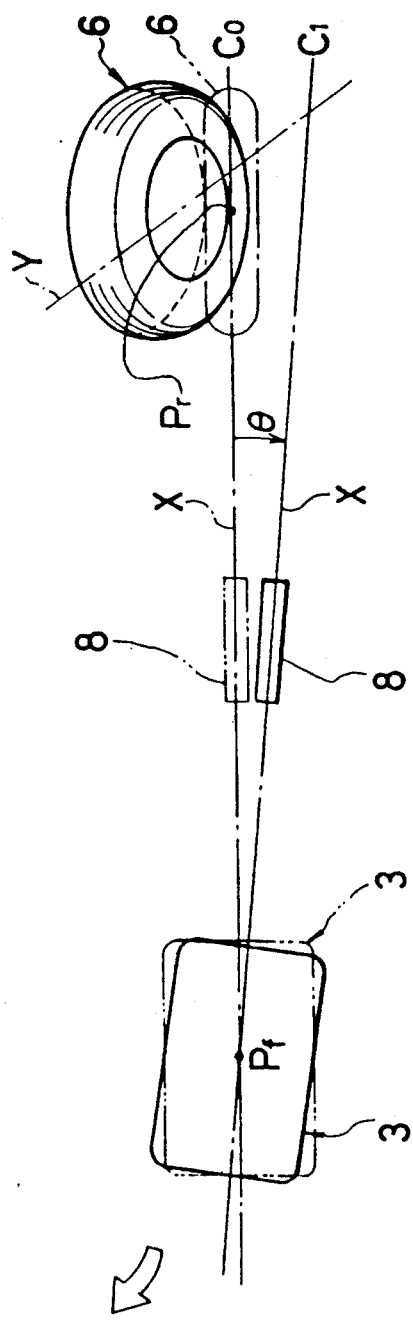
FIGS. 2 and 3 are schematic plan views of the motorcycle, showing the manner in which it operates.

The manner in which the motorcycle operates when it makes a turn will be described with reference to FIGS. 1 and 2.

When the motorcycle running straight is to turn to the right, the rider of the motorcycle shifts his weight to the right to turn the main frame 4 about the joint shaft 8 for thereby causing the seat frame 9 as well as the main frame 4 and the rear wheel 6 to bank to the right, counteracting centrifugal forces exerted on the motorcycle during the turn. At this time, since the wide flat tread tire 2 is mounted on the front wheel 3, it prevents the front frame 1 and the front wheel 3 from banking to the right.

As described above, the axis X of the joint shaft 8 extends below the point Pr where the rear wheel 5 contacts the road surface. Therefore, as the rear wheel 6 banks to the right about the axis X, the rear portion of the joint shaft 8 is displaced leftwardly of the point Pr as seen in plan in FIG. 2, with the result that the axis X is tilted an angle $\theta$ to the left from a position $C_0$ to a position $C_1$. In response to such tilting movement of the joint shaft 8, the front wheel 3 is turned to the right about a point Pf where the front wheel 3 contacts the road surface, as shown in FIG. 2. As a result, the motorcycle is turned to the right.

As described above, as the main frame 4 and the rear wheel 6 bank, the front wheel 3 is automatically caused to turn in the same direction as the bank of the main frame 4 and the rear wheel 6. For the motorcycle to effect a normal turn, the main frame 4 is simply required to bank in the direction in which the motorcycle is to be turned, and it is not necessary to steer the front wheel 3. Since no steering mechanism is needed for the front wheel 3, the front wheel 3 and the power unit 7 are spaced a fixed distance from each other, and hence drive power from the power unit 7 can be transmitted to the front wheel 3 through a comparatively simple transmission mechanism.

Inasmuch as the front wheel 3, which is a drive wheel, does not bank as described above, the front wheel 3 applies large gripping forces to the road, and hence large drive power can be given to the front wheel 3 even while the motorcycle is making a turn. Consequently, the motorcycle can turn at a high speed.

Figure 3:
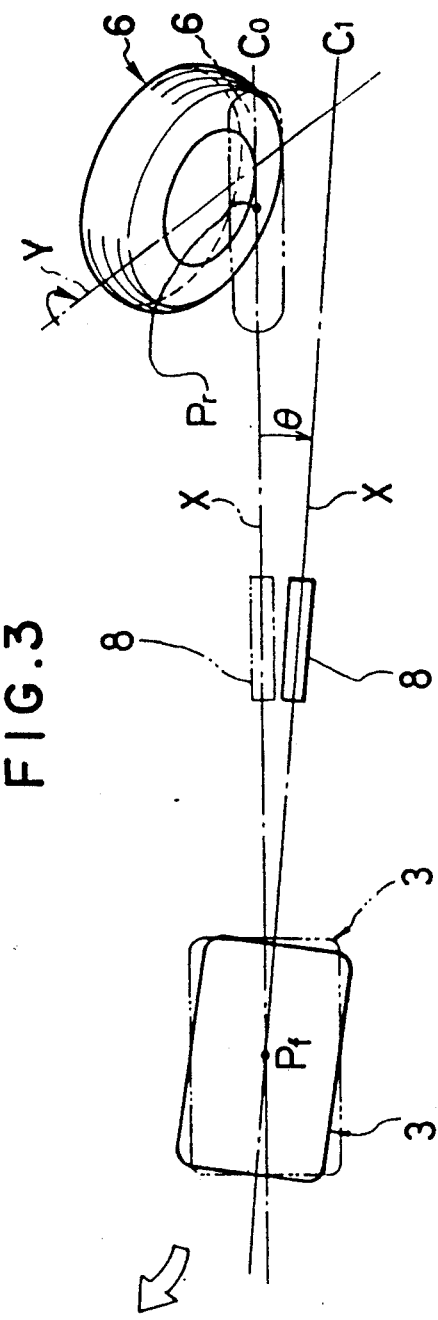

The assembly of the rear wheel 6 supported on the steering shaft 18, the rear fork 19, the swing arm 20, and the damper 21 has a center of gravity G which is positioned forwardly of the axis Y of the steering shaft 18 as shown in FIG. 1. As a result, as shown in FIG. 3, the rear wheel 6 is turned of its own accord about the steering shaft 18 in the same direction as the front wheel 3 is turned, toward the side to which the main frame 4 is caused to bank.

When the motorcycle is to be turned at a high speed, such a high-speed turn can be facilitated by operating the steering handle 25 to turn the rear wheel 6 in the same direction as the front wheel 3. When the motorcycle is to be turned at a low speed with a small turning circle radius, such a low-speed turn can be made easy by operating the steering handle 25 to turn the rear wheel 6 in the opposite direction to the front wheel 3.

Figure 4:
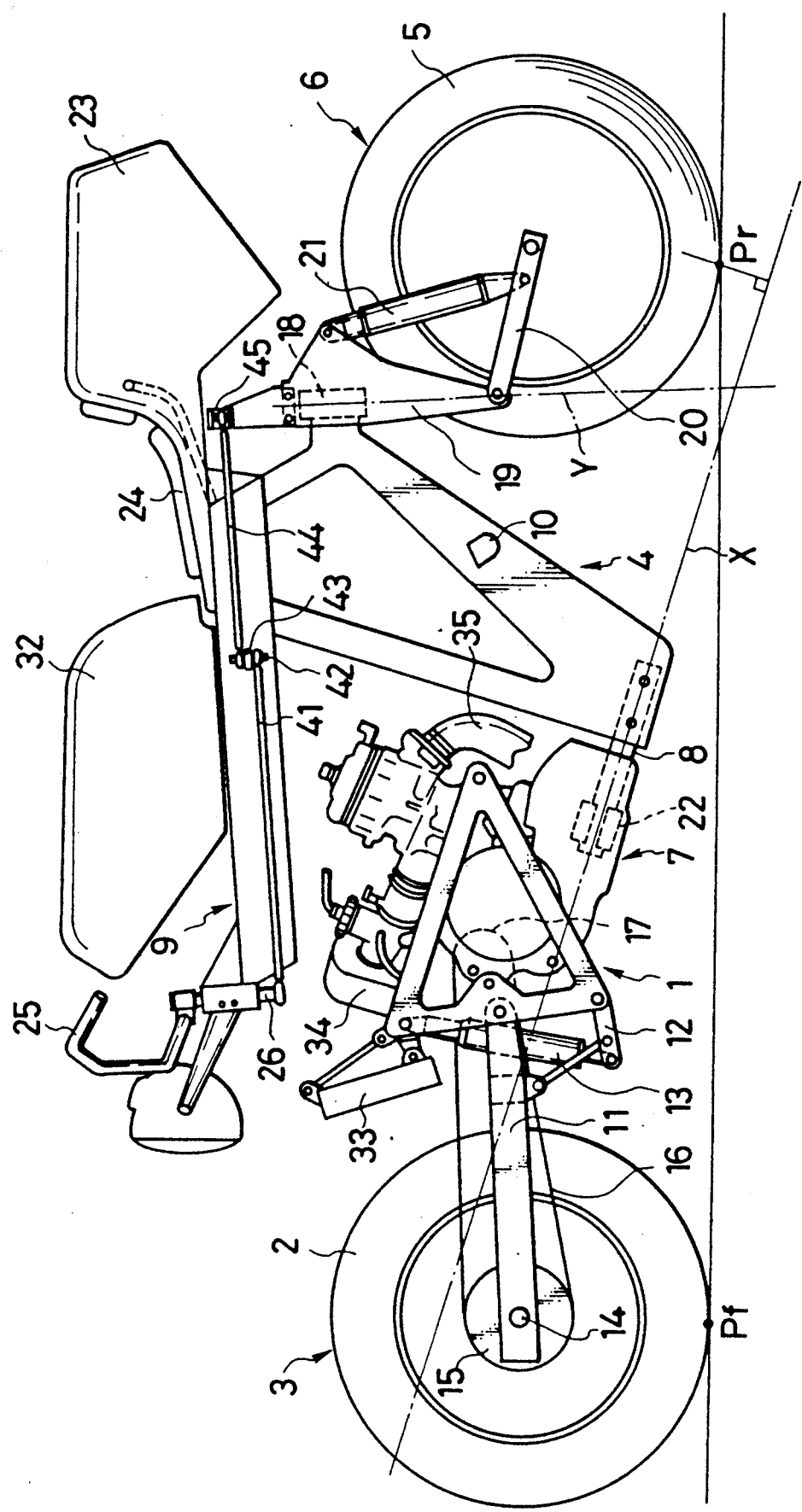
FIG. 4 is a side elevational view of a front-wheel-drive motorcycle according to another embodiment of the present invention.

A front-wheel-drive motorcycle according to another embodiment of the present invention will hereinafter be described with reference to FIGS. 4 and 5. The motorcycle shown in FIGS. 4 and 5 is substantially the same as the motorcycle shown in FIG. 1 except for a rear wheel steering mechanism. Those parts shown in FIGS. 4 and 5 which are identical to those of FIG. 1 are denoted by identical reference numerals, and will not be described in detail.

The rear wheel steering mechanism of the motorcycle shown in FIGS. 4 and 5 turns the rear wheel 6 in the same direction as the front wheel 3 for increased high-speed turning performance.

The steering handle 25 for steering the rear wheel 6 is mounted on the substantially vertical handle shaft 26 which is rotatably supported by the seat frame 9.

An attachment member 40 is integrally joined to the handle shaft 26 and projects laterally of the seat frame 9. A tie rod 41 having a front end pivotally mounted on the distal end of the attachment member 40 extends along the seat frame 9. The rear end of the tie rod 41 is pivotally coupled to the lower surface of an outer end of a swing member 43 which is horizontally swingably supported by a shaft 42 on a side of the seat frame 9. Another tie rod 44 has a front end pivotally coupled to the upper surface of the outer end of the swing member 43 in coaxial alignment with the pivoted end of the tie rod 41. The tie rod 44 extends rearwardly and has a rear end pivotally coupled to a distal end of an attachment member 45 which extends laterally from the rear fork 19 that is supported on the steering shaft 18.

Therefore, when the steering handle 25 is turned about the axis of the steering shaft 26, the rear wheel 6 is also turned in the same direction as the steering handle 25 is turned.

The angular interval by which the rear wheel 6 is turned in response to the turning of the steering handle 25 can easily be varied by varying the position where the tie rods 41, 44 are attached to the swing member 43.

When the motorcycle is to turn at a high speed, the rider's weight is shifted in the direction in which the turn is to be made, to turn the main frame 4 about the joint shaft 8 to cause the seat frame 9 to bank together with the main frame 4 and the rear wheel 6. Then, the front wheel 3 is automatically turned in the direction in which the motorcycle is to be turned. By turning the steering handle 25 in the same direction, the rear wheel 6 is steered also in the same direction. The ability of the motorcycle to turn at a high speed is increased by turning the front and rear wheels 3, 6 in the same direction.

FIG. 6 shows a modified mechanism for turning the rear wheel 6. According to the modification shown in FIG. 6, when the motorcycle is to turn at a high speed, the main frame 4 and the rear wheel 6 are caused to bank by shifting the rider's weight as described above, and when the motorcycle is to turn at a low speed with a small turning circle radius, the steering handle 25 is turned to turn the rear wheel 6 in the direction opposite to the direction in which the motorcycle is to turn.

As illustrated in FIG. 6, a mechanism for turning the rear wheel 6 includes a tie rod 51 operatively coupled at a front end thereof to the steering handle 25 and having the rear end pivotally coupled to an inner end of a swing member 53 pivotally supported on a side of the seat frame 9. The rear wheel turning mechanism also includes another tie rod 54 having a rear end pivotally coupled to the rear fork 19 and a front end pivotally coupled to a outer end of the swing member 53. Therefore, when the steering handle 25 is turned in a direction in which the motorcycle is to turn, the rear wheel 6 is turned in the opposite direction.

Although certain preferred embodiments have been shown and described, it should be understood that many changes and modifications may be made therein without departing from the scope of the appended claims.

What is claimed is:

1. A front-wheel-drive motorcycle comprising:
a main frame supporting a rear wheel with a rounded tread tire mounted thereon and also supporting a saddle seat;
a front frame supporting a front drive wheel with a flat tread tire mounted thereon; and
a joint shaft extending in a longitudinal direction of the motorcycle, said main frame being coupled to said front frame by said joint shaft for angular movement about the joint shaft.

2. A front-wheel-drive motorcycle according to claim 1, wherein said joint shaft extends at an angle such that the axis thereof passes below a point where said rear wheel contacts a road surface.

3. A front-wheel-drive motorcycle according to claim 1, further including a power unit for driving said front wheel, said power unit being mounted on said front frame.

4. A front-wheel-drive motorcycle according to claim 3, further including a swing arm by which said front wheel is supported on said front frame.

5. A front-wheel-drive motorcycle according to claim 1, wherein said main frame has a front portion overhanging said front frame.

6. A front-wheel-drive motorcycle according to claim 1, further including a steering handle for steering said rear wheel.

7. A front-wheel-drive motorcycle according to claim 6, wherein said steering handle is mounted on a front portion of said main frame, said rear wheel being supported on a rear portion of said main frame.

8. A front-wheel-drive motorcycle according to claim 7, further including means on said main frame for transmitting steering action of said steering handle to said rear wheel.

* * * * *